US008751237B2

(12) United States Patent
Kubota

(10) Patent No.: US 8,751,237 B2
(45) Date of Patent: Jun. 10, 2014

(54) TEXT-TO-SPEECH DEVICE AND TEXT-TO-SPEECH METHOD

(75) Inventor: Koumei Kubota, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 56 days.

(21) Appl. No.: 13/575,610

(22) PCT Filed: Feb. 23, 2011

(86) PCT No.: PCT/JP2011/001037
§ 371 (c)(1),
(2), (4) Date: Jul. 27, 2012

(87) PCT Pub. No.: WO2011/111321
PCT Pub. Date: Sep. 15, 2011

(65) Prior Publication Data
US 2012/0323578 A1 Dec. 20, 2012

(30) Foreign Application Priority Data

Mar. 11, 2010 (JP) .................................. 2010-053980

(51) Int. Cl.
*G10L 13/08* (2013.01)
(52) U.S. Cl.
USPC ............................ 704/260; 704/258; 704/267
(58) Field of Classification Search
USPC ............... 704/258, 260, 270, 272, 270.1, 267
See application file for complete search history.

(56) References Cited

U.S. PATENT DOCUMENTS 7,610,201 B2 * 10/2009 Yamada ........................ 704/260
7,885,814 B2 * 2/2011 Ikegami ........................ 704/260

FOREIGN PATENT DOCUMENTS

| JP | H03-214983 A | 9/1991 |
| JP | H04-076670 A | 3/1992 |
| JP | 2000-089778 A | 3/2000 |
| JP | 2000-125221 A | 4/2000 |
| JP | 2007-067595 A | 3/2007 |

* cited by examiner

*Primary Examiner* — Huyen X. Vo
(74) *Attorney, Agent, or Firm* — Judge Patent Associates

(57) ABSTRACT

A sound control section (114) selects and outputs a text-to-speech item from items included in program information multiplexed with a broadcast signal; and starts or stops outputting the text-to-speech item, based on request from a remote controller control section (113). A sound generation section (115) converts the text-to-speech item to a sound signal. A speaker (109) reproduces the sound signal. The sound control section (114) compares each item of information about a program currently selected by user's operation of the remote controller, with each item of information about the previous program selected just before the user's operation. If an item of the currently selected program information is the same as the corresponding item of the operation-prior program information, and text-to-speech processing has been already completed for the item after the last change in the item, the sound control section (114) stops outputting the item to the sound generation section (115).

6 Claims, 4 Drawing Sheets

TEXT-TO-SPEECH DEVICE AND TEXT-TO-SPEECH METHOD

TECHNICAL FIELD

The present invention relates to a text-to-speech device and a text-to-speech method for the vocal reading out of the content of an electronic program guide used on a digital broadcast receiving device, thereby informing a user of the content.

BACKGROUND ART

In recent years, many of digital broadcast receiving devices and many of broadcast recording devices that record television broadcast programs have an electronic program guide (hereinafter, which may be also referred to as an EPG) function whereby a program guide to broadcast programs is displayed on a screen, by using a data signal that is transmitted multiplexed with a video sound signal of a broadcast program. A user can easily grasp programs that are currently being broadcasted or programs that are going to be broadcasted in the future without referring to a program guide in a newspaper or a magazine. In addition, with simple operations, a user can schedule viewing so as not to miss a specific program, and schedule recording so as to have a specific program recorded when the user is absent.

However, such an EPG screen on which comparatively small text is densely displayed over the entire screen is hard to view for a person with poor vision or a person with impaired vision, thus having poor usability.

Considering the above, Patent Literature 1 vocally reproduces program information of an EPG, thereby increasing the operability for a user. That is, if a user has selected a specific program on a displayed EPG screen by moving a cursor, summary information about the selected program is displayed and also is vocally reproduced through a speaker.

Based on the above method, if a user sequentially selects programs displayed on the EPG screen in, for example, chronological order by the cursor, summary information about programs is sequentially read aloud. However, this means that even where the broadcast date and the broadcast station (broadcast channel number) remain the same irrespective of selected programs, information with the same date and broadcast-station content is repeatedly read aloud for each program. Such repetition of reading aloud of the same information is redundant as provided information. In addition, since it takes a longer time to read out information vocally than to view and recognize the information, the operability for a user decreases.

Considering the above, Patent Literature 2 employs a method of "omitting text-to-speech processing for identical information." That is, in text-to-speech processing of Patent Literature 2, text broadcast data (for example, news, weather forecast, traffic information, broadcast program introduction, or the like) that is reiteratively received in text multiplex broadcasts carried out in analog television broadcasting in Japan, is read out vocally only when there is a change in the text broadcast data. Thus, the problem of repeatedly reading out the same information is solved.

CITATION LIST

Patent Literature

[PTL 1] Japanese Laid-Open Patent Publication No. 2000-125221

[PTL 2] Japanese Laid-Open Patent Publication No. H03-214983

SUMMARY OF THE INVENTION

Problems to be Solved by the Invention

As described above, the method of Patent Literature 1, makes possible the vocal reading out of program information about a program designated by an operation of selecting a program displayed on an EPG screen, and applying the method of Patent Literature 2 makes it possible to prevent the same information from being repeatedly read aloud.

However, in an actual operation of selecting programs displayed on an EPG screen, a satisfactory operability cannot necessarily be provided by only using the above methods. The reason will be described below.

FIG. 4 is a diagram showing a display example of an EPG screen. Times are indicated in the vertical direction, and broadcast stations are indicated in the horizontal direction. A rectangle solid line frame indicates the current position of a cursor, at which a program A1 of a broadcast station A which starts at 23:00 is selected. From this state, if a user performs an operation of moving the position of the cursor to the next program A2 below, that is, if a user performs an operation of movement A1A2 shown in FIG. 4, by using the above method in which "the same information is not repeatedly read out", the broadcast station and the date (day) are not read aloud because they are the same as those of the previous program, but only a broadcast start time and a program content (a program title, a performer, a summary of program, and the like) is read aloud.

If a user further performs an operation of selecting a program in the next time slot, that is, performs an operation of movement A2A3 shown in FIG. 4 to select a program A3, the date and the day (hereinafter, simply referred to "date") change to the next date, and therefore text-to-speech processing starts to vocally read out information including the new date. In this situation, supposing that the program that a user desires to view is program A4, since the user is not interested program A3, immediately after moving the cursor to program A3, the user presumably will move the cursor to the program A4 by an operation of movement A3A4.

By the above operation, the text-to-speech processing for reading out program information about the program A3 is stopped in an extremely short time, and text-to-speech processing for program information about the program A4 is started before the new date is read out or in the middle of the text-to-speech processing for the new date. In this case, according to the conventional method, the date of the program A4 is not read out in text-to-speech processing for program information about the program A4 because the date of the program A4 is the same as that of the program A3 that has been previously selected, and further, when the subsequent programs are sequentially selected, the date of these programs is not read out. As a result, a user continues operations without being informed of change in the date by text-to-speech processing. Thus, such a special service function using text-to-speech processing cannot sufficiently exert its effect.

The present invention has been made to solve the above problems, and an object of the present invention is to provide a text-to-speech device and a text-to-speech method which ensure that, in program selecting operation on an EPG screen, when a user has moved a cursor to a program and an element such as a date is changed, the user is informed of the change.

Solution to the Problems

In order to achieve the above object, a text-to-speech device according to the first aspect of the present invention includes: a display section configured to display program information multiplexed with a broadcast signal, the program information including a plurality of items; a memory configured to store the program information; a remote controller control section configured to receive selection information about a program in accordance with a user's operation of a remote controller; a sound control section configured to determine a text-to-speech item from the plurality of items included in the program information, and output the text-to-speech item; a sound generation section configured to convert the content of the text-to-speech item to a sound signal; and a sound output section configured to reproduce the sound signal, wherein the sound control section compares the content of each item of currently selected program information about a program currently selected in accordance with a user's operation of the remote controller, with the content of each item of operation-prior program information about the previous program selected just before the user's operation, and determines, as the text-to-speech items, those items of the currently selected program information whose content is the same as the content of the corresponding item of the operation-prior program information, yet has not been reproduced by the sound output section since the last change of the content.

Thus, it becomes possible to provide a text-to-speech device capable of, in text-to-speech processing for program information multiplexed with a broadcast, omitting text-to-speech processing for an item that has not changed from the corresponding item in information about the previously selected program, thereby increasing the efficiency of the text-to-speech processing, and also, if a selecting operation is performed before the last change in the item is completely read aloud, continuing to set the item as a text-to-speech processing target at the subsequent opportunity of text-to-speech processing, thereby ensuring that a user is vocally informed of such a change.

In the text-to-speech device according to the second aspect based on the first aspect, the program information is information for generating a broadcast program guide on the display section.

Thus, it becomes possible to, in text-to-speech processing for program information displayed on an EPG screen, omit text-to-speech processing for an item that has not changed from the corresponding item in program information that has been previously read out vocally, thereby increasing the efficiency of the text-to-speech processing, and also, if text-to-speech processing has not been completed for the item, continue to set the item as a text-to-speech processing target at the subsequent opportunity of text-to-speech processing, thereby ensuring that a user is vocally informed of the item.

The text-to-speech device according to the third aspect based on the second aspect further includes a program guide control section configured to generate the broadcast program guide by using the program information, and move a cursor for selecting a specific program on a displayed screen of the broadcast program guide, wherein the program guide control section outputs, to the sound control section, currently selected program information about a program currently selected by the cursor, and operation-prior program information about the previous program selected just before movement of the cursor.

Thus, text-to-speech processing for a changed item is controlled in accordance with an operation of program selection by a cursor on an EPG screen. Therefore, it is ensured that a user is informed of a changed item during a general operation on an EPG screen.

A text-to-speech method according to the fourth aspect of the present invention includes: a display step of displaying program information multiplexed with a broadcast signal, the program information including a plurality of items; a storing step of storing the program information; a remote controller control step of receiving selection information about a program in accordance with a user's operation of a remote controller; a sound control step of determining a text-to-speech item from the plurality of items included in the program information, and output the text-to-speech item; a sound generation step of converting the content of the text-to-speech item to a sound signal; and a sound output step of reproducing the sound signal, wherein the sound control step compares the content of each item of currently selected program information about a program currently selected in accordance with a user's operation of the remote controller, with the content of each item of operation-prior program information about the previous program selected just before the user's operation, and determines, as the text-to-speech item, an item, of the currently selected program information, whose content is the same as the content of the corresponding item of the operation-prior program information and that has not been reproduced in the sound output step since the last change of the content.

In the text-to-speech method according to the fifth aspect based on the fourth aspect, the program information is information for generating a broadcast program guide in the display step.

The text-to-speech method according to the sixth aspect based on the fifth aspect further includes a program guide control step of generating the broadcast program guide by using the program information, and move a cursor for selecting a specific program on a displayed screen of the broadcast program guide, wherein the program guide control step outputs, to the sound control step, program information about a program currently selected by the cursor, and program information about the previous program selected just before movement of the cursor.

Advantageous Effects of the Invention

According to the present invention, it becomes possible to provide a text-to-speech device capable of, in text-to-speech processing for program information multiplexed with a broadcast, particularly for program information for EPG display, omitting text-to-speech processing for an item that has not changed from the corresponding item in information about the previously selected program, thereby increasing the efficiency of the text-to-speech processing, and also, if the text-to-speech processing for an item is stopped before the item is completely read out vocally, the text-to-speech device continues to set the item as a text-to-speech processing target at the subsequent opportunity of text-to-speech processing, thereby ensuring that a user is vocally informed of such a changed item.

DESCRIPTION OF EMBODIMENTS

Hereinafter, a text-to-speech device according to an embodiment of the present invention will be described with reference to the drawings. It is to be noted that the text-to-speech device of the present invention is a digital broadcast receiving device having a text-to-speech function.

Figure 1:
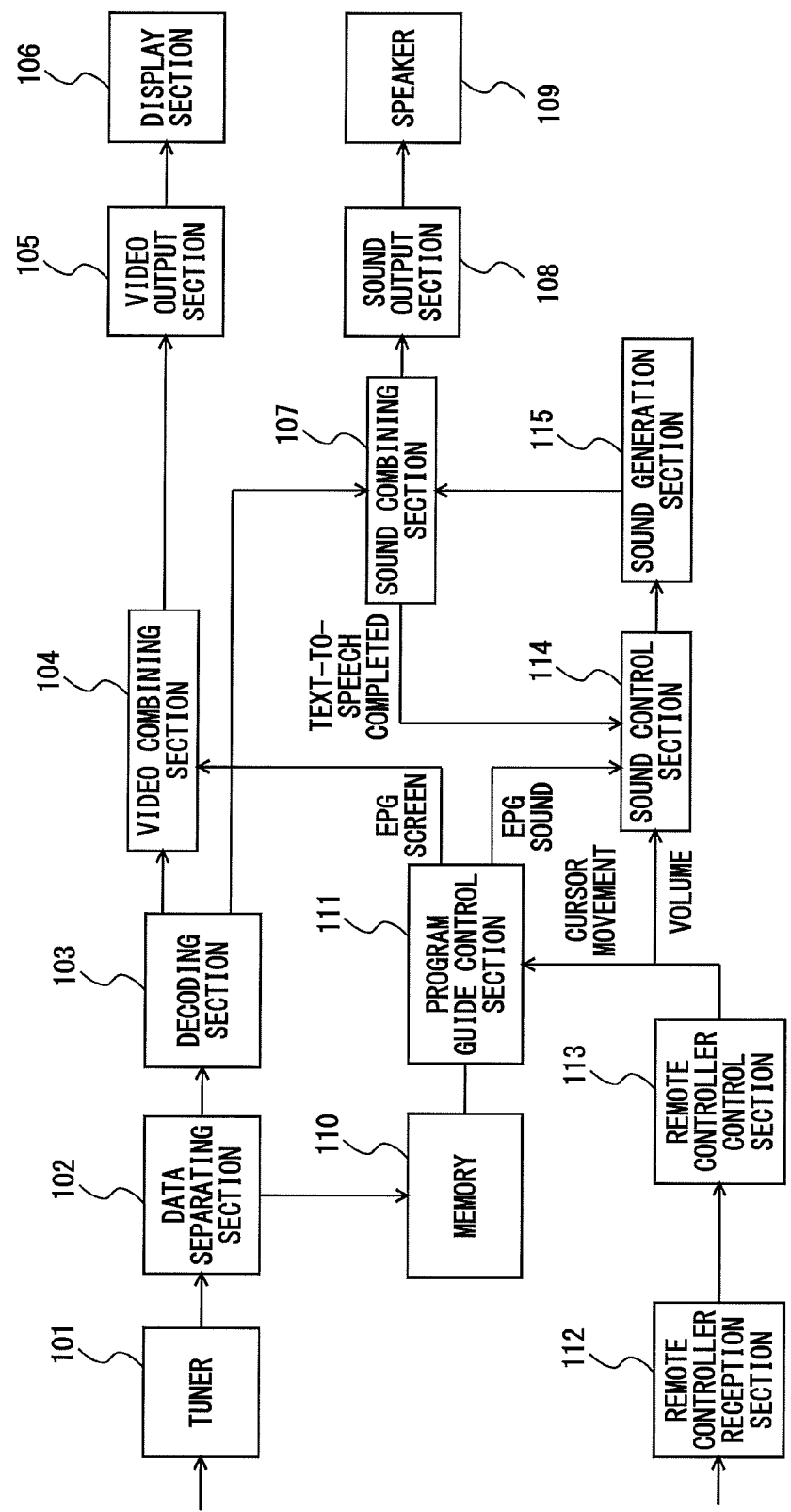
FIG. 1 is a block diagram showing an example of the configuration of a text-to-speech device according to an embodiment of the present invention.

FIG. 1 is a block diagram showing an example of the configuration of the text-to-speech device according to the embodiment of the present invention. The text-to-speech device includes a tuner 101, a data separating section 102, a decoding section 103, a video combining section 104, a video output section 105, a display section 106, a sound combining section 107, a sound output section 108, a speaker 109, a memory 110, a program guide control section 111, a remote controller reception section 112, a remote controller control section 113, a sound control section 114, and a sound generation section 115.

A broadcasting radio wave received by an antenna (not shown) is inputted to the tuner 101. The tuner 101 performs amplification, channel tuning, and demodulation for the broadcasting radio wave, extracts digital data that includes video data, sound data, and program-associated information data, and outputs the digital data to the data separating section 102.

The data separating section 102 receives an output from the tuner 101, and separates the output into MPEG (Moving Picture Experts Group) data that includes the video data and the sound data, and the program-associated information data that includes an electronic program guide.

The decoding section 103 decodes the MPEG data and outputs the video data and the sound data to the video combining section 104 and the sound combining section 107, respectively.

The video combining section 104 outputs video data for a program and video data for an EPG screen in a combined manner or in a switched manner. The video output section 105 converts the video data outputted from the video combining section 104 into a predetermined display format, and outputs the resultant data to the display section 106. The display section 106 is a display device. For example, a liquid crystal display panel or a plasma display panel is used for the display section 106.

The sound combining section 107 outputs sound data for a program and sound data for text-to-speech processing for program information about an EPG screen, in a combined manner or in a switched manner. The sound output section 108 converts and amplifies inputted sound data to an analog signal. The speaker 109 reproduces sound. Various configurations may be applied to the speaker 109 in accordance with the specification of the digital broadcast receiving device, that is, the speaker 109 may be composed of one speaker, or may be composed of a plurality of speakers for stereophonic effect.

The memory 110 stores program information (here, program information for EPG display) inputted thereto. The program guide control section 111 generates an EPG screen (broadcast program guide) by using the program information, and controls display of a cursor indicating which program is currently selected on the EPG screen.

The remote controller reception section 112 receives a remote controller signal which is infrared light emitted from a remote controller device operated by a user, and outputs a pulse train corresponding to the operation, to the remote controller control section 113. The remote controller control section 113 analyzes the remote controller signal and sends the user's operation to the program guide control section 111 and the sound control section 114.

The sound control section 114 selects, as a text-to-speech item, an item included in the program information, from the program guide control section 111, and performs volume adjustment in accordance with an instruction from the remote controller control section 113. The sound generation section 115 converts text information about text-to-speech data to a sound signal (sound waveform data).

The text-to-speech device having the above configuration operates as follows. First, video data for broadcast program is processed through the tuner 101, the data separating section 102, the decoding section 103, the video combining section 104, and the video output section 105, and then reproduced as video by the display section 106. Similarly, sound data for broadcast program is processed through the tuner 101, the data separating section 102, the decoding section 103, the sound combining section 107, and the sound output section 108, and then reproduced as sound by the speaker 109.

Next, program information transmitted being multiplexed as attachment information will be described. The program information as program attachment information data separated by the data separating section 102 is stored in the memory 110. The program guide control section 111 extracts the program information from the memory 110, to generate an EPG screen. In addition, the program guide control section 111 moves a cursor on the EPG screen in accordance with a cursor movement instruction outputted from the remote controller control section 113, and recognizes that a specific program is selected. The EPG screen and the cursor generated as described above are sent to the video output section 105 via the video combining section 104, and then displayed on the display section 106.

Next, text-to-speech processing of vocally reading out program information about a program selected by the cursor will be described. The sound control section 114 extracts, from the program guide control section 111, operation-prior program information which has been previously read out vocally, and currently selected program information which is to be read out vocally at this time, and detects change between them. In general, if the cursor moves in the time axis direction to select a program, there is no change in broadcast station item or date item (except for the case where the cursor moves between two days). On the other hand, information about a broadcast start time and the content of a program (the title, a performer, the summary, and the like of a program) is, as a matter of course, different between this time (currently selected program information) and the previous time (operation-prior program information). Therefore, such information is detected as an item that has changed. Information about such an item that has changed is sent, as text-to-speech information, to the sound generation section 115, and the sound generation section 115 converts the information to sound data. Then, the sound data is processed through the sound combining section 107, and is reproduced by the sound output section 108 via the speaker 109.

Here, while the sound control section 114 selects a text-to-speech item based on the change between the currently selected program information and the operation-prior program information which has been selected just before the current program information is selected, the sound control section 114 also uses the following condition for determination of the selection. That is, even if there is no change in information, an item that has not been completely read out vocally at the previous time because the previous text-to-speech processing has been interrupted by a user's operation or the like is included, as text-to-speech-uncompleted item, in the above text-to-speech information. It is to be noted that the sound combining section 107 notifies the sound control section 114 of information about whether or not the previous text-to-speech processing has been completely performed.

Figure 2:
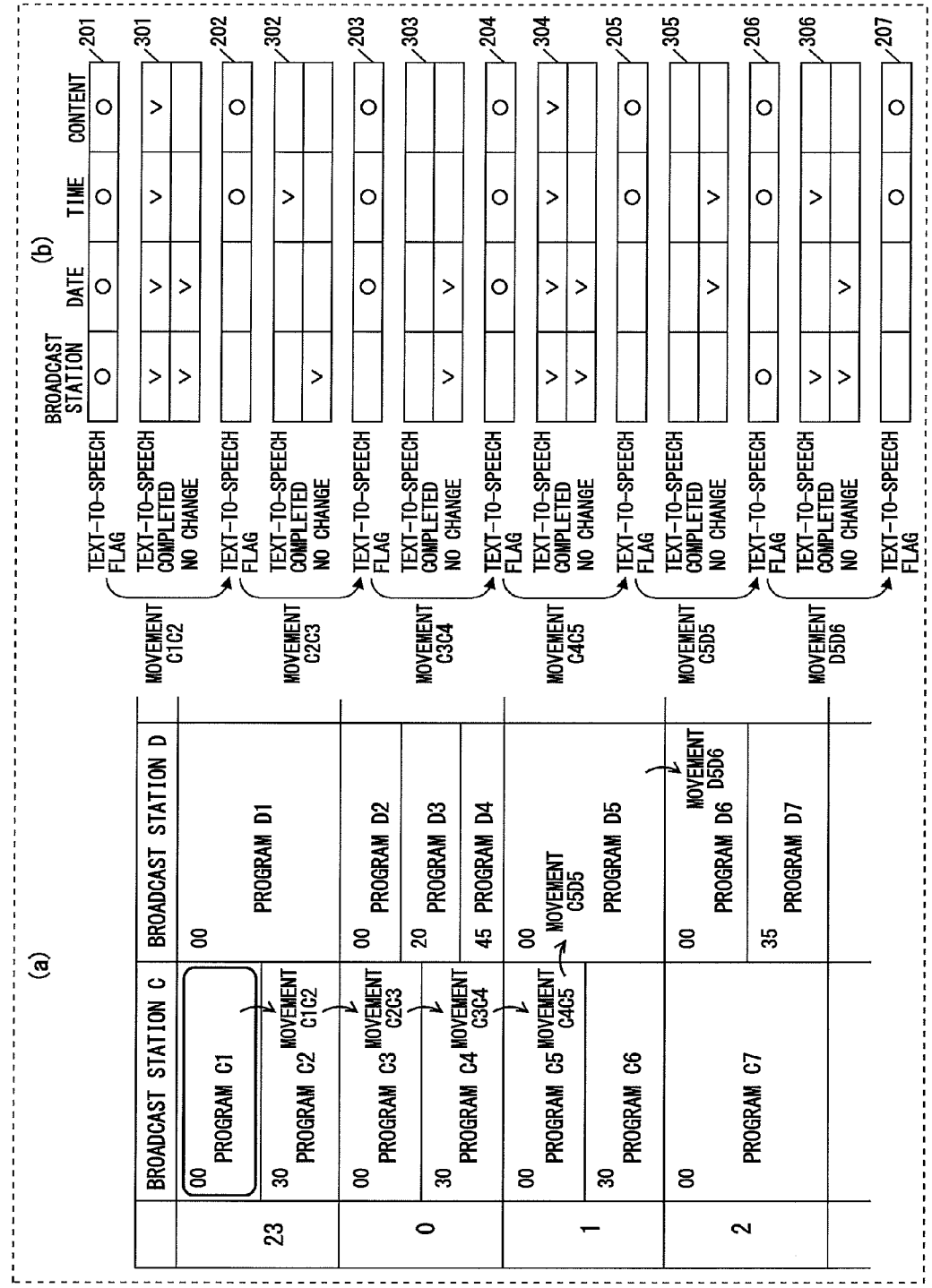
FIG. 2 is an explanation diagram of an example of the operation of the text-to-speech device according to the embodiment of the present invention.

In order to ensure the above operation, a text-to-speech flag is set for each item, and managed. FIG. 2 is an explanation diagram of an example of the operation of the text-to-speech device according to the embodiment of the present invention. Part (a) of FIG. 2 shows movement of the cursor on the EPG screen. As shown in part (a) of FIG. 2, the cursor moves to select programs in order, program C1, program C2, program C3, program C4, program C5, program D5, then program D6. Here, the date changes in movement C2C3, and the broadcast station changes in movement C5D5. When the program C2 is selected, the cursor stays until text-to-speech processing is completed for only the time indication. When the program C1 is selected and when the program C4 is selected, the cursor stays until text-to-speech processing is completed for all the items. When the program D5 is selected, the cursor stays until text-to-speech processing is completed for the broadcast station and the time indication. At the other programs (program C3 and program C5), the cursor only stays until the cursor passes each of the other programs in continuous movement, that is, the cursor moves from such other programs to the next program immediately after text-to-speech processing is started. Therefore, it will be assumed that the text-to-speech processing is not executed at the above other programs.

Part (b) of FIG. 2 is a table showing change in the text-to-speech flags used for selecting an item as a text-to-speech target (here, from four items of broadcast station, date, time, and program content), in the case where the cursor moves as described above. Transition boxes 301 to 306 are shown between flag display boxes 201 to 207. The transition boxes 301 to 306 each include boxes indicating "text-to-speech processing for item is completed" and boxes indicating "there is no change in item," which are used for determination of change in the text-to-speech flags and are check-marked as appropriate.

In the initial state at the program C1, all the flags are turned on. The initial state is the state in which the program guide control section 111 has generated an EPG screen by using program information extracted from the memory 110 and the cursor is displayed at a program of a broadcast station that is currently being viewed. In the initial state, all the items are targets of text-to-speech processing. When text-to-speech processing has been completed for all the items in the initial state, the "text-to-speech processing completed" boxes for all the items are check-marked as shown in the transition box 301. In addition, since the broadcast station and the date do not change in the movement C1C2, the "no change" boxes for these items are check-marked. As a result, after the cursor has moved to the program C2, the broadcast station and the date have not changed, and text-to-speech processing for these items has been already completed. Therefore, the text-to-speech flags for the broadcast station and the date in the flag display box 202 are turned off, so that these items are not dealt with as text-to-speech processing targets. On the other hand, since the time and the program content have changed, the text-to-speech flags for the time and the program content are still on.

In the movement C2C3, since the cursor passes through 24:00, the date changes. That is, the "no change" box for the date in the transition box 302 becomes blank, and the text-to-speech flag for the date in the flag display box 203 is turned on after the cursor has moved to the program C3. In addition, at the program C2, since text-to-speech processing is completed for only the time, the "text-to-speech processing completed" box for the time in the transition box 302 is check-marked.

In the movement C3C4, the broadcast station and the date do not change, but text-to-speech processing has not been completed for the date at the program C3. Therefore, the text-to-speech processing flag for the date in the flag display box 204 is still on. That is, at the program A4, the date is a text-to-speech processing target though the date has not changed from the program C3.

In the movement C4C5, the date do not change, and at the program C4, text-to-speech processing has been completed for the date. Therefore, the text-to-speech flag for the date in the flag display box 205 is turned off. That is, at the program C5, the date is not a text-to-speech processing target.

In the movement C5D5, since the broadcast station changes, the "no change" box for the broadcast station in the transition box 305 becomes blank. Therefore, at the program D5, the text-to-speech flag for the broadcast station in the flag display box 206 is turned on. On the other hand, since the start time of the program D5 is 1:00 which is the same as the start time of the program C5, the "no change" box for the time in the transition box 305 is check-marked. However, at the program C5, text-to-speech processing has not been completed for the time indication. Therefore, the text-to-speech flag for the time in the flag display box 206 is still on, and the time indication is a text-to-speech processing target at the program D5.

In the movement D5D6, since text-to-speech processing has been completed for the broadcast station at the program D5, the text-to-speech flag for the broadcast station in the flag display box 207 is turned off at the program D6. That is, the broadcast station is not a text-to-speech processing target.

As described above, the sound control section 114 performs ON/OFF control of the text-to-speech flags, based on information about whether or not text-to-speech processing has been completed and whether or not there is a change in each item, thereby determining whether or not to perform text-to-speech processing for each item.

Figure 3:
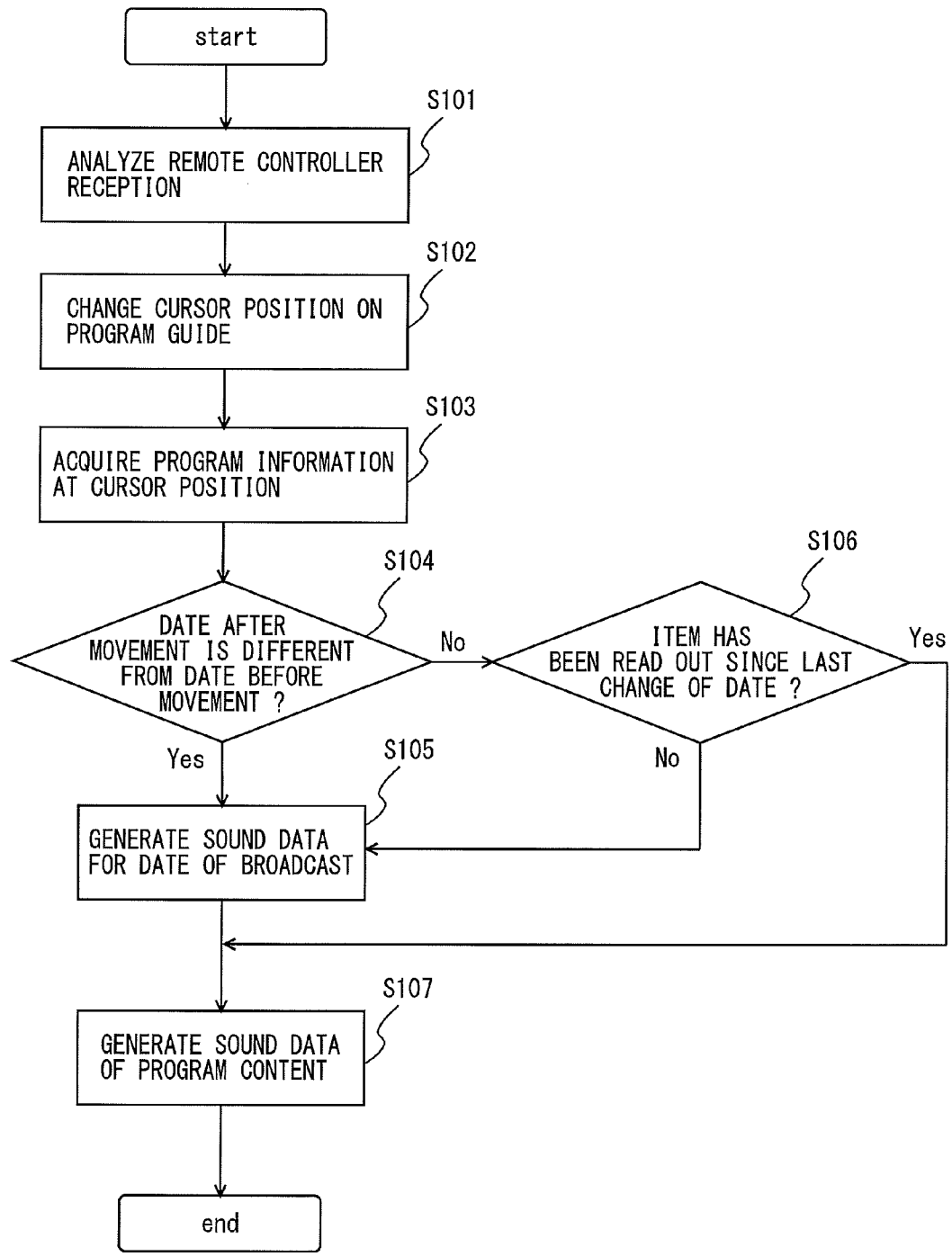
FIG. 3 is a flowchart showing a process of the operation of the text-to-speech device according to the embodiment of the present invention.
Figure 4:
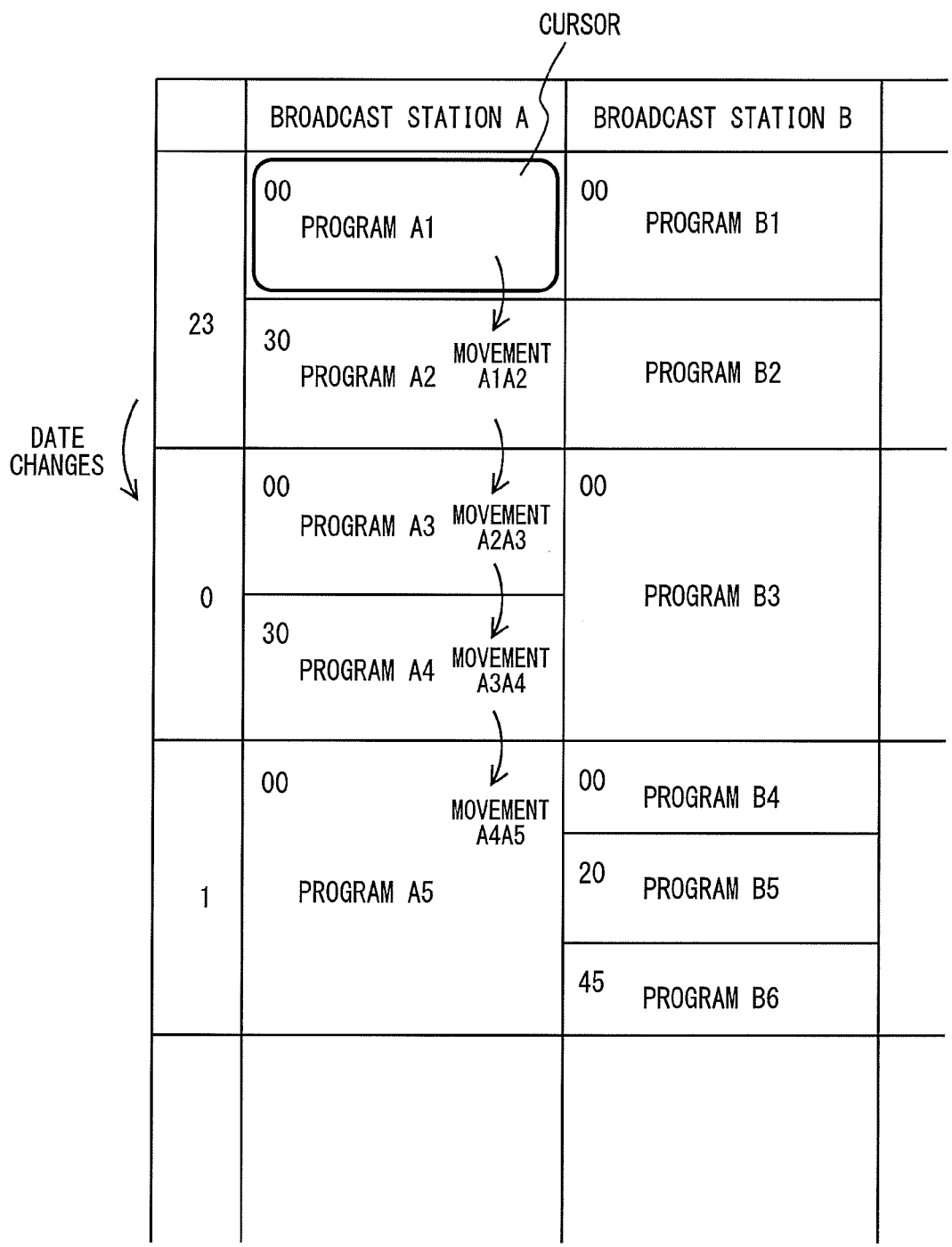
FIG. 4 is a diagram showing a display example of an EPG screen.

FIG. 3 is a flowchart showing a process of the operation for selecting a text-to-speech item, performed by the text-to-speech device according to the embodiment of the present invention. Here, the case where whether or not to perform text-to-speech processing is determined for only the date item will be described as an example. In step S101, a signal received from the remote controller is analyzed. Next, in step S102, the position of the cursor on the EPG screen is changed in accordance with an operation on the remote controller. That is, the position of the cursor is moved upward, downward, rightward, or leftward. In step S103, program information about a program indicated by the moved position of the cursor is acquired. It is noted that program information at the position of the cursor as it was before the cursor movement has been already stored in the memory 110. The above steps S101 to S103 are realized mainly by the memory 110 and the program guide control section 111.

In step S104, the date of the program at the moved position of the cursor is compared with the date of the program at the position as it was before the cursor movement. If the date of the moved position has changed from the previous one (Yes in step S104), the process proceeds to step S105 to generate sound data for the date of the moved position. If the date of the moved position has not changed from the previous one (No in step S104), the process proceeds to step S106 to determine whether or not text-to-speech processing has been already completed for the date of the moved position in accordance with the corresponding text-to-speech flag and the text-to-speech processing completion information. If text-to-speech processing has not been completed for the date yet (No in step S106), the process proceeds to step S105 to generate sound data for the date of the moved position. If text-to-speech processing has been already completed for the date (Yes in step S106), sound data is not generated, and the process proceeds to step S107 to generate sound data for program content.

As described above, in text-to-speech processing for program information multiplexed with a broadcast, particularly for program information for EPG display, the text-to-speech device according to the embodiment of the present invention omits text-to-speech processing for an item that has not changed from the corresponding item in information about the previously selected program, thereby increasing the efficiency of the text-to-speech processing. Meanwhile, if the text-to-speech processing for an item is stopped before the item is completely read out aloud, the text-to-speech device continues to set the item as a text-to-speech processing target at the subsequent opportunity of text-to-speech processing, thereby ensuring that a user is vocally informed of such a changed item.

In the above embodiment, text-to-speech processing has been described by using an EPG screen formed in two-dimensional matrix, as an example. However, the present invention is also applicable to an electronic program (introduction) guide formed as a one-dimensional list of program information.

In the above embodiment, changes in date (day), time, and broadcast station (channel number) are detected. However, other intrinsic items such as a broadcast medium (terrestrial television, satellite, cable television, Internet, and the like), a broadcast mode (normal, high definition, 3-dimensional, and the like), and a genre of program (music, movie, sport, drama, and the like), may be used.

In the above embodiment, the selected program is changed by cursor movement. However, such change may be conducted by other various operations performed by a user, such as changing a date tab or switching a broadcast medium.

In the above embodiment, when the date has changed, text-to-speech processing for the date is not completed until the cursor stops its movement and there is a sufficient time for completing text-to-speech processing. However, a specific item may be set to be always completely read aloud, whereby text-to-speech processing is forcibly completed for such a specific item even while the cursor continuously moves. For example, only the day may be always read aloud at the point when the day changes. In this case, even if the cursor is continuously moved by the remote controller, sound saying, for example, "Monday," "Tuesday," and then "Wednesday" is emitted every time the cursor moves between two days.

In the above embodiment, a specific item in the program information is set as the "item to be always completely read aloud." However, for example, when the program information has changed owing to reorganization of programs, when new recording is started and the recording entry is added on a recording list screen by a recording device, or on every hour during operation, a text-to-speech sound for such a fact may be generated in real time.

Industrial Applicability

According to the present invention, it is possible to provide a text-to-speech function for program information with an increased operability for a wide variety of users including a user with impaired vision, in operation on an EPG screen of a digital broadcast receiving device or a broadcast recording device, for example.

DESCRIPTION OF THE REFERENCE CHARACTERS

101 tuner
102 data separating section
103 decoding section
104 video combining section
105 video output section
106 display section
107 sound combining section
108 sound output section
109 speaker
110 memory
111 program guide control section
112 remote controller reception section
113 remote controller control section
114 sound control section
115 sound generation section
201 to 207 flag display box
301 to 306 transition box

The invention claimed is:

1. A text-to-speech device comprising:
   a display section configured to display program information, the program information including a plurality of items;
   a reception section configured to receive selection information about a program in accordance with a user's operation;
   a sound control section configured to compare the content of each item of currently selected program information about a program currently selected in accordance with a user's operation, with the content of each item of operation-prior program information about the previous program selected just before the user's operation, and determine, as the text-to-speech item, that item of the currently selected program information whose content is the same as the content of the corresponding item of the operation-prior program information and that has not been reproduced as a sound signal;
   a sound generation section configured to convert the content of the text-to-speech item to a sound signal; and
   a sound output section configured to reproduce the sound signal obtained through the conversion.

2. The text-to-speech device according to claim 1, wherein the program information is information for generating a broadcast program guide on the display section.

3. The text-to-speech device according to claim 2, further comprising:
   a program guide control section configured to use the program information to generate the broadcast program guide, and to move a cursor for selecting a specific program on a displayed screen of the broadcast program guide; wherein
   the program guide control section outputs, to the sound control section,
   program information about a program currently selected by the cursor, and
   program information about the previous program selected just before movement of the cursor.

4. In a text-to-speech device, a text-to-speech method for converting program information displayed on a display section of the text-to-speech device into a sound signal, and outputting the sound signal from a sound output section of the text-to-speech device, the text-to-speech method comprising:
- a display step of displaying program information on the text-to-speech device display section, the program information including a plurality of items;
- a reception step of a reception section of the text-to-speech device receiving selection information about a program in accordance with a user's operation;
- a sound control step of a sound control section of the text-to-speech device comparing the content of each item of currently selected program information about a program currently selected in accordance with a user's operation, with the content of each item of operation-prior program information about the previous program selected just before the user's operation, and determining, as the text-to-speech item, that item of the currently selected program information whose content is the same as the content of the corresponding item of the operation-prior program information and that has not been reproduced as a sound signal;
- a sound generation step of the text-to-speech device sound control section converting the content of the text-to-speech item to a sound signal; and
- a sound output step of the text-to-speech device sound output section reproducing the sound signal obtained through the conversion.

5. The text-to-speech method according to claim 4, wherein the program information is information for generating a broadcast program guide in the display step.

6. The text-to-speech method according to claim 5, further comprising:
- a program guide control step of using the program information to generate the broadcast program guide, and to move a cursor for selecting a specific program on a displayed screen of the broadcast program guide; wherein
- the program guide control step outputs, to the sound control step, program information about a program currently selected by the cursor, and program information about the previous program selected just before movement of the cursor.

* * * * *